(12) United States Patent
Johnson

(10) Patent No.: US 7,000,268 B2
(45) Date of Patent: Feb. 21, 2006

(54) PATIENT TRANSFER AND TRANSPORT BED

(75) Inventor: Daniel T. Johnson, Wayzata, MN (US)

(73) Assignee: Dane Industries, Inc., Brooklyn Park, MN (US)

( * ) Notice: Subject to any disclaimer, the term of this patent is extended or adjusted under 35 U.S.C. 154(b) by 0 days.

(21) Appl. No.: 11/017,974

(22) Filed: Dec. 21, 2004

(65) Prior Publication Data

US 2005/0102748 A1    May 19, 2005

Related U.S. Application Data

(63) Continuation of application No. 10/369,210, filed on Feb. 18, 2003, now Pat. No. 6,854,137.

(60) Provisional application No. 60/357,911, filed on Feb. 18, 2002.

(51) Int. Cl.
    *A61G 7/10*    (2006.01)

(52) U.S. Cl. .................. 5/81.1 R; 5/86.1; 5/81.1 C; 5/81.1 HS

(58) Field of Classification Search .............. 5/81.1 R, 5/81.1 C, 86.1, 88.1, 81.1 HS, 510
    See application file for complete search history.

(56) References Cited

U.S. PATENT DOCUMENTS

| | | | | |
|---|---|---|---|---|
| 2,691,782 A | * | 10/1954 | West | 5/81.1 HS |
| 2,918,681 A | | 12/1959 | Davis | |
| 3,493,979 A | * | 2/1970 | Crook, Jr. et al. | 5/81.1 C |
| 3,597,672 A | * | 8/1971 | Seesselberg et al. | 318/259 |
| 3,765,037 A | | 10/1973 | Dunkin | |
| 3,854,152 A | | 12/1974 | Chez | |
| 3,875,599 A | * | 4/1975 | Mracek et al. | 5/706 |
| 3,967,328 A | | 7/1976 | Cox | |
| 4,073,016 A | | 2/1978 | Koll | |
| 4,087,873 A | | 5/1978 | Ohkawa | |
| 4,274,168 A | | 6/1981 | Depowski | |
| 4,761,841 A | | 8/1988 | Larsen | |
| 4,794,655 A | | 1/1989 | Ooka et al. | |
| 4,839,933 A | | 6/1989 | Plewright et al. | |
| 4,873,732 A | * | 10/1989 | Perez | 5/81.1 HS |
| 4,987,623 A | | 1/1991 | Stryker et al. | |
| 5,197,156 A | | 3/1993 | Stryker et al. | |
| 5,855,207 A | * | 1/1999 | Moenning et al. | 128/845 |
| 5,937,456 A | | 8/1999 | Norris | |
| 6,427,270 B1 | | 8/2002 | Blevins et al. | |

* cited by examiner

*Primary Examiner*—Michael Trettel
(74) *Attorney, Agent, or Firm*—Dorsey & Whitney LLP

(57) ABSTRACT

The present invention is a transfer and transport device and method for moving a patient from a bed to another location within a medical facility. The transport device includes an integral transfer mechanism for transferring a patient from a hospital bed to the device and back.

22 Claims, 16 Drawing Sheets

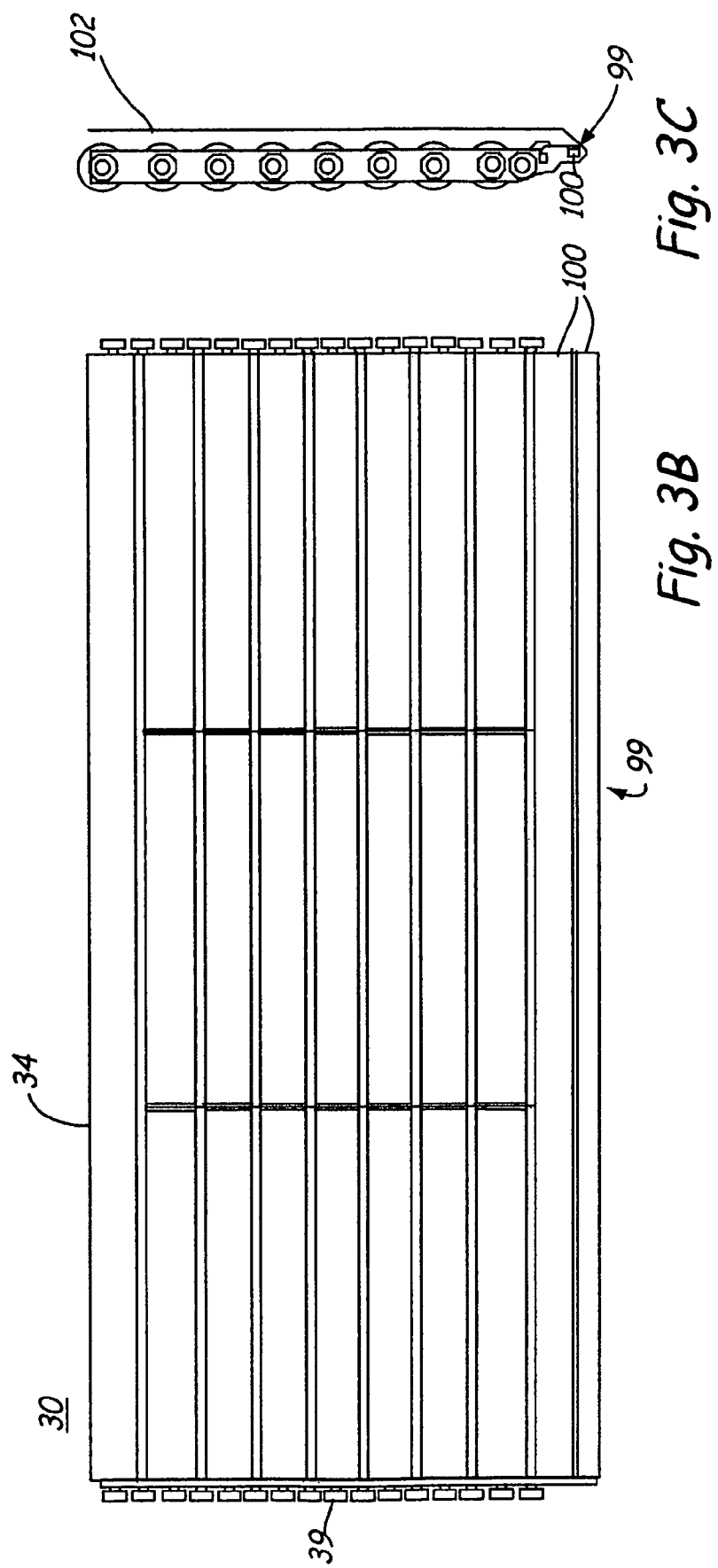

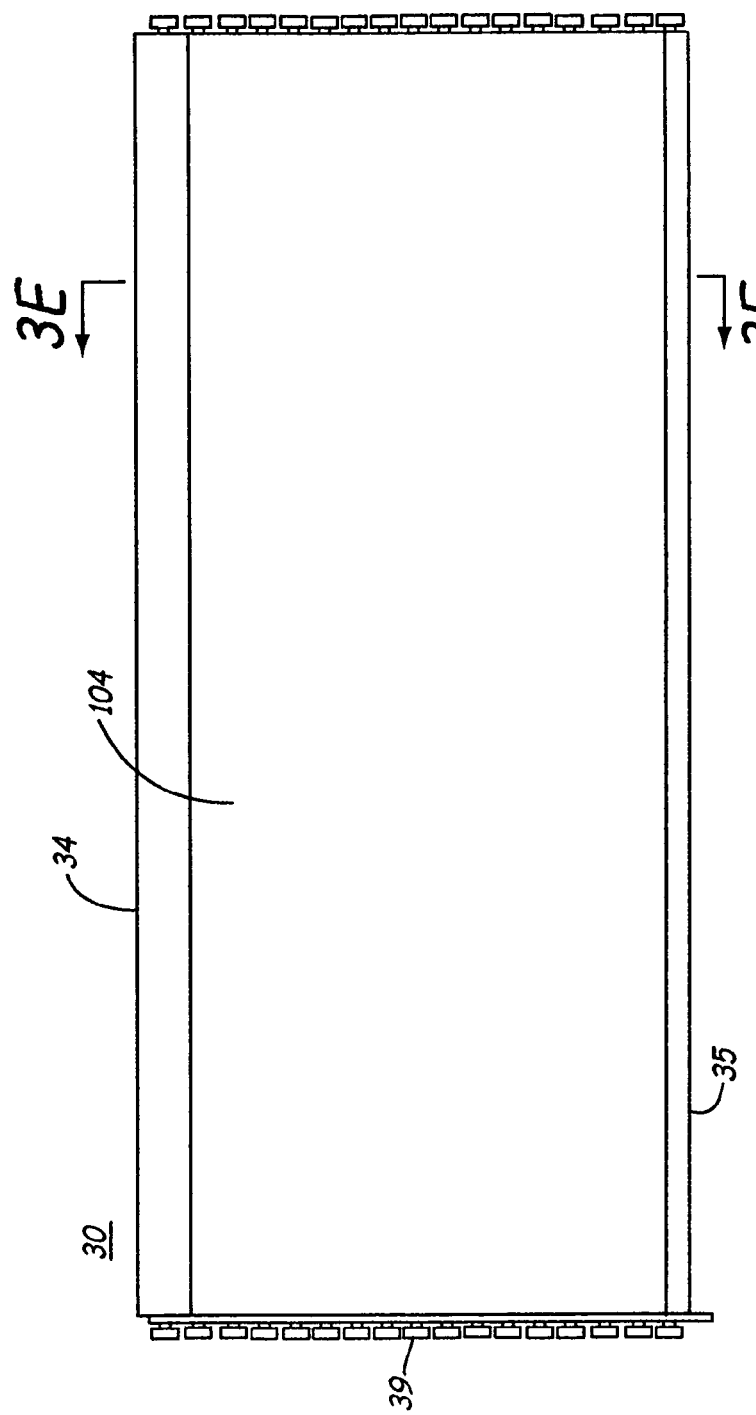

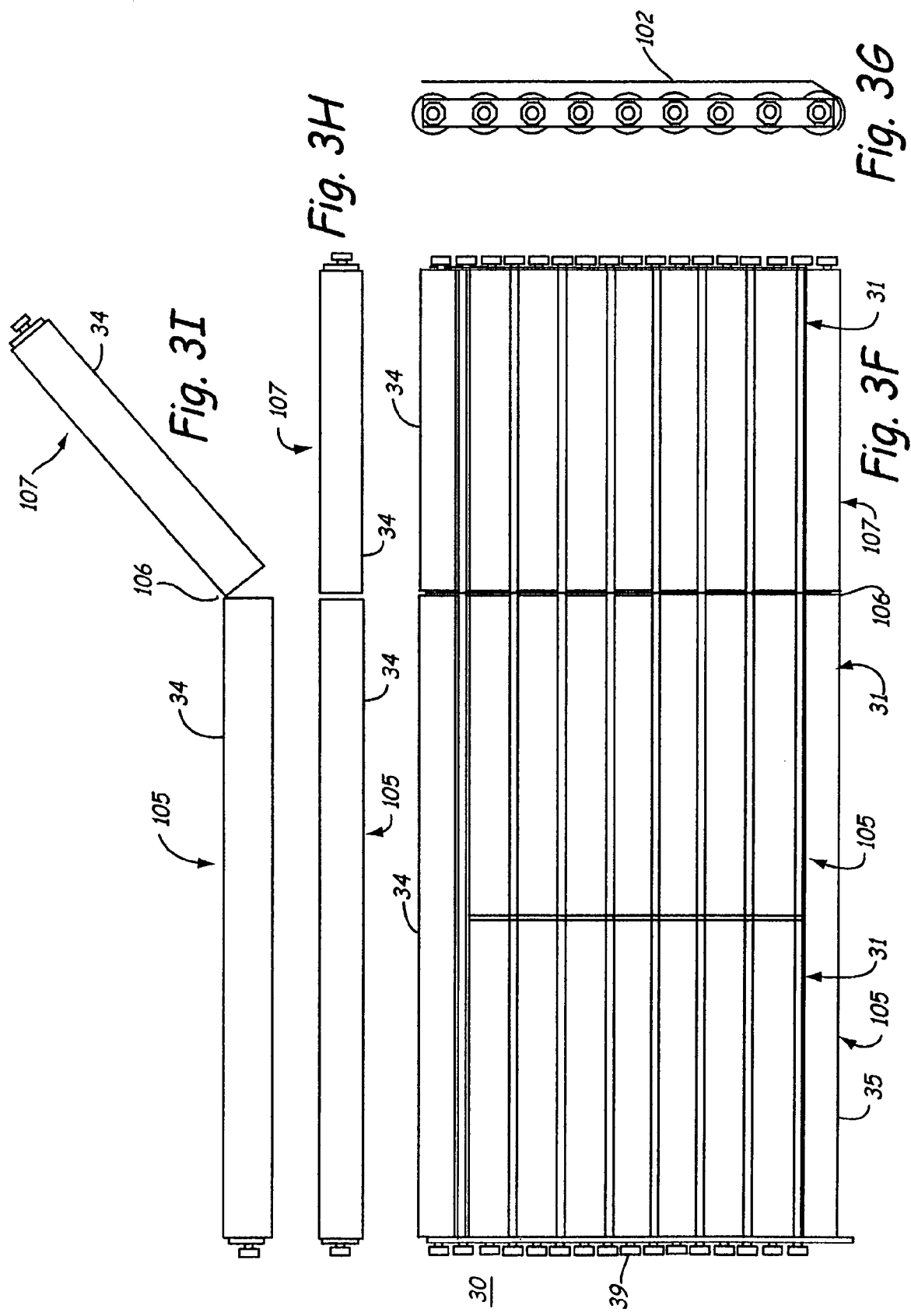

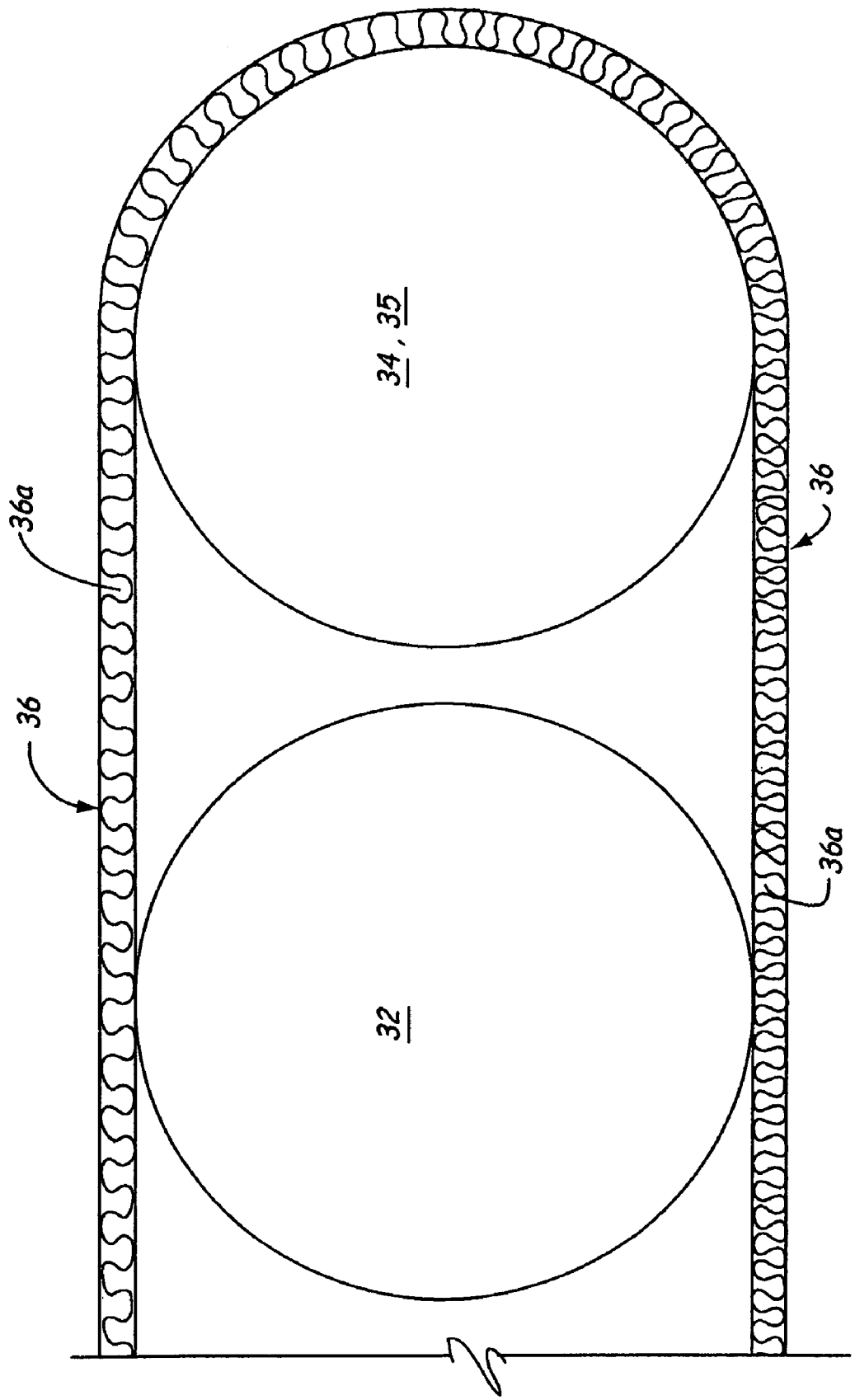

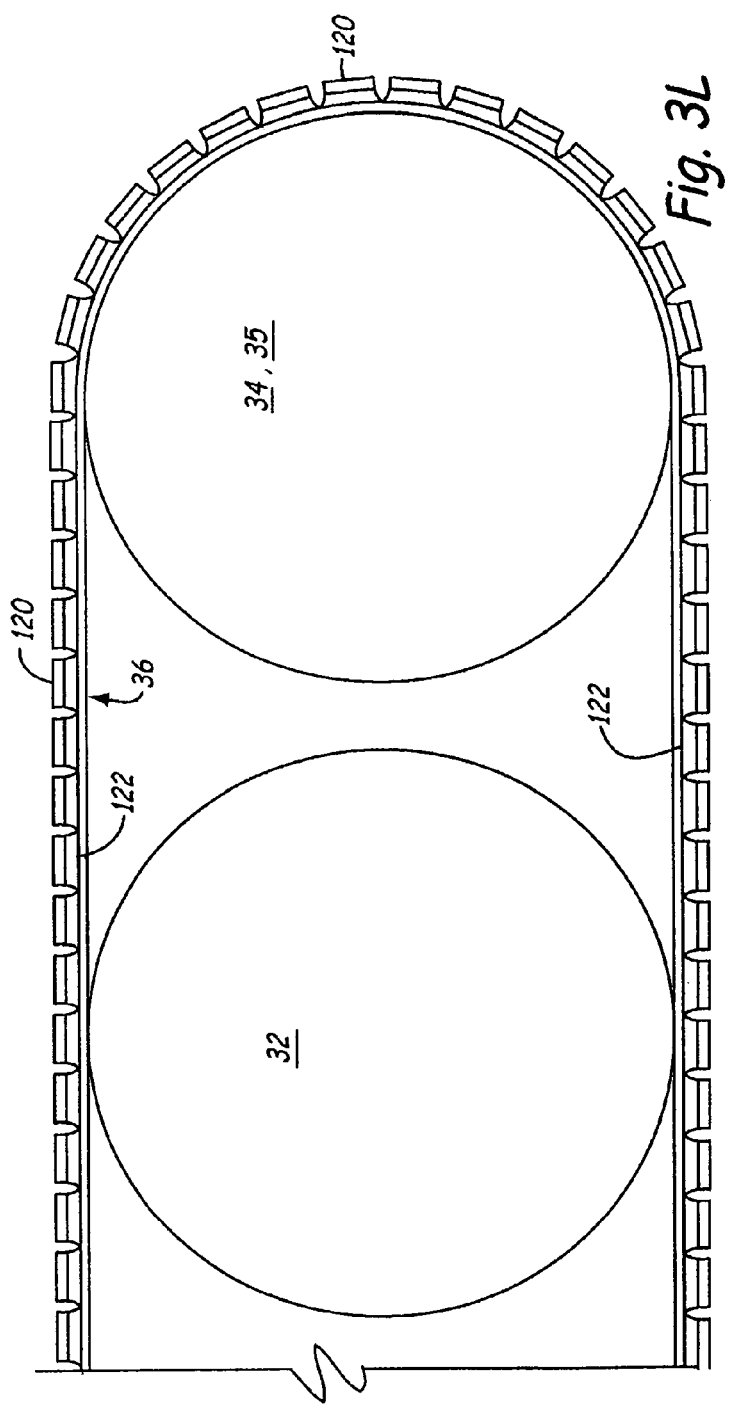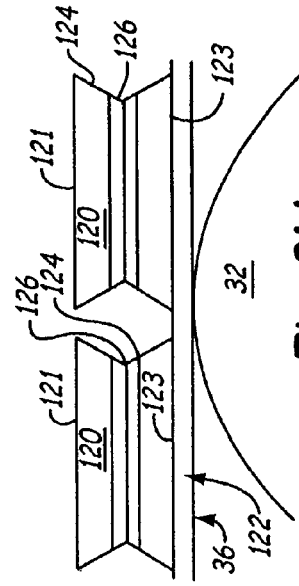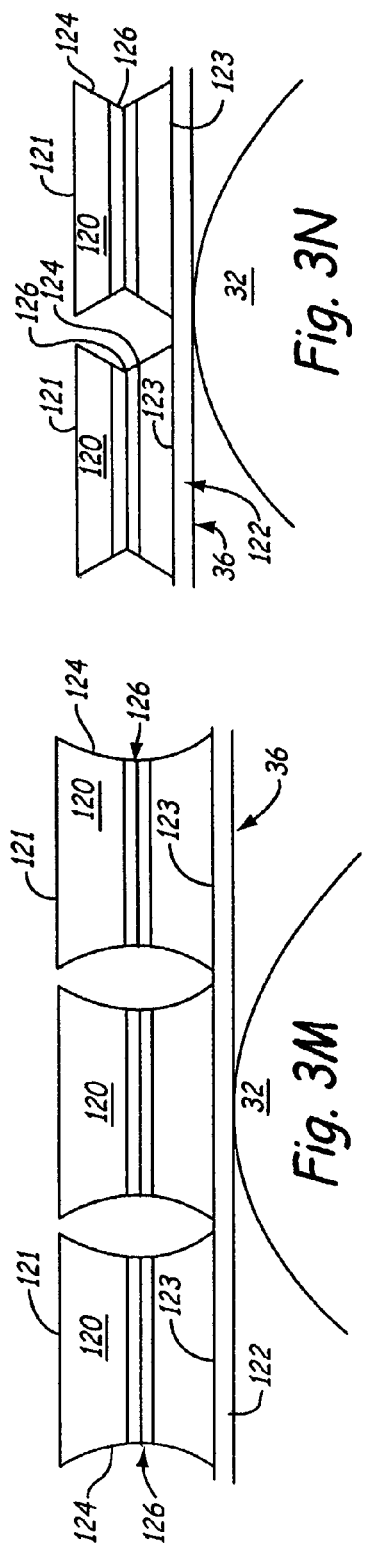

70

```
┌─────────────────────────────────────────────────┐
│ POSITION TRANSPORT DEVICE ALONG SIDE PATIENT'S BED │—72
└─────────────────────────────────────────────────┘
                        │
┌─────────────────────────────────────────────────┐
│ ADJUST HEIGHT OF TRANSPORT DEVICE SUCH          │—74
│ THAT SUPPORT ARMS ARE HIGHER THAN BED           │
└─────────────────────────────────────────────────┘
                        │
┌─────────────────────────────────────────────────┐
│ LOWER SAFETY RAIL AND LOCK WHEELS               │—76
│ OF TRANSPORT DEVICE                             │
└─────────────────────────────────────────────────┘
                        │
┌─────────────────────────────────────────────────┐
│ EXTEND TRANSFER ARMS UNTIL LOCATED              │—78
│ NEAR CENTER OF PATIENT'S BED                    │
└─────────────────────────────────────────────────┘
                        │
┌─────────────────────────────────────────────────┐
│ LOWER TRANSFER PLATFORM UNTIL                   │—80
│ TRANSFER ARMS CONTACT PATIENT'S BED             │
└─────────────────────────────────────────────────┘
```

*Fig. 7A*

PATIENT TRANSFER AND TRANSPORT BED

The present application is a continuation patent application of U.S. patent application Ser. No. 10/369,210, filed Feb. 18, 2003, and entitled "Patient Transfer and Transport Bed", now U.S. Pat. No. 6,854,137; which claims the benefit under 35 U.S.C. §119(e) to U.S. Provisional Application No. 60/357,911, filed Feb. 18, 2002, and entitled "Patient Transfer and Transport Device."

BACKGROUND OF THE INVENTION

Patients in a medical care facility frequently require movement from one location to another within the facility. The frequent movement is necessitated by the configuration of a typical facility. A typical medical care facility is organized into several activity centers. These activity centers may include, for example, an emergency room, the patient's home location (i.e., the patient's room), one or more operating rooms, a radiology area, and a recovery area. Each of these areas typically has a procedural surface onto which the patient must be transferred, upon arrival at the activity center. For example, at the patient's home location, the patient must be transferred to his bed. And at the operating rooms, the patient must be transferred to the operating table. And in the radiology area, the patient must be transferred to an x-ray table. The configuration of a typical medical care facility necessitates numerous patient transfer events, during the course of treatment. For example, a patient needing an x-ray may be subjected to four transfer events (from his bed to a gurney, from the gurney to the x-ray table, from the x-ray table to the gurney, and from the gurney back to his bed) and two transport events (from his room to radiology and from radiology back to his room).

The transfer is typically performed by transferring the patient from a bed to a transport device, such as a gurney. Often the patient requiring movement is not conscious or cannot physically assist in the transfer, and so must be transferred by hospital personnel. This process typically involves two or more persons transferring the patient onto a transfer device (e.g., a roller-board or back-board), lifting the patient from the bed, and moving the patient to the transport device. This process is a leading cause of injuries to hospital personnel, including nurses. Furthermore, this process can lead to injury to the patient caused either by improper manipulation or dropping. This process will continue to become more difficult and injury-prone in the future, as studies consistently show that the average weight of the population, including the hospital patient population, is steadily increasing.

Prior devices for assisting in this transfer process include roller-boards, backboards, and hoists. Roller-boards are unsafe if used improperly and require two or more people to complete the transfer. Hoists must be manipulated under the patient and often lift the patient in an awkward position, causing patient discomfort. An additional transfer device is a horizontal transfer device, which pulls the patient on a sheet of material from one surface to another. This device suffers from several disadvantages including compromised patient safety. Roller-boards, back-boards, hoists, and horizontal transfer devices are also all separate devices from the actual transport device, which requires that the device be present at each activity center or be transported along with the patient.

There is a need in the art for an improved patient transfer and transport device adapted to facilitate movement of a person from a stationary bed onto a mobile platform, and from the mobile platform onto a procedure surface, and back to the stationary bed. There is a further need for an integral transfer and transport system that allows a single operator, possessing a minimum level of strength, to perform the patient transfer safely and efficiently.

BRIEF SUMMARY OF THE INVENTION

The present invention, in one embodiment, is a patient transfer and transport device for transferring a patient from a bed to the transport device and for moving the patient. The device includes a base, including a plurality of wheels. A frame is coupled to the base. A transfer platform is moveably coupled to the frame, and includes a roller frame and a conveyor surface disposed around the roller frame. The roller frame has a plurality of rollers including at least one drive roller. A pair of extendable transfer arms is coupled to the frame. Each transfer arm includes a slotted channel, for slidably mating with the transfer platform, and at least one contact sensor for contacting the bed. It further includes an electrically powered linear actuator having a gear connected to at least one of the extendable transfer arms for extending the transfer arms laterally from the device.

The present invention, in another embodiment, is a method for transferring a patient from a bed to a transfer and transport device. In this embodiment, the method includes positioning the transfer and transport device along side the bed. The height of the transfer platform is manipulated such that the support arms are above the bed height. The wheels of the device are locked to prevent movement during the transfer process. The transfer arms are extended until they extend to near a center of the bed. The transfer platform is lowered until the arms contact the bed. The operator logrolls the patient away from the device and extends the transfer platform until it reaches the patient's back. The operator logrolls the patient onto the transfer platform. The operator activates the conveyor to pull the patient onto a center of the transfer platform. The operator causes the return of the transfer platform to a transport position. The device is raised and the transfer arms are retracted.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3B is a top plan view of the transfer platform, according to an embodiment having a tapered edge, with the conveyor surface removed revealing rollers, roller banks, and a roller frame.

FIG. 3C is an end elevation view of the transfer platform of FIG. 3B.

FIG. 3D is a top plan view of the transfer platform, according to one embodiment, with the conveyor surface removed revealing a low-friction platform in place of roller banks.

FIG. 3E is a lateral sectional elevation view of the transfer platform of FIG. 3D, taken along the line 3E—3E.

FIG. 3F is a top plan view of the transfer platform, according to one embodiment capable of being inclined for patient comfort, with the conveyor surface removed revealing rollers, roller banks, and a roller frame.

FIG. 3G is an end elevation view of the transfer platform of FIG. 3F.

FIG. 3H is a side elevation view of the transfer platform of FIG. 3F with the inclinable roller bank in the flat position.

FIG. 3I is a side elevation view of the transfer platform of FIG. 3F with the inclinable roller bank in the inclined position.

FIG. 3K is a lateral cross-sectional elevation of some of the rollers, according to one embodiment, where at least a portion of the conveyor surface is padded to create a soft, comfortable resting surface for the patient.

FIG. 3L is a lateral end elevation of some of the rollers, according to one embodiment, where at least a portion of the conveyor surface is padded by a series of soft ribs, which each run longitudinally across the conveyor surface generally parallel to the longitudinal axis of the rollers.

FIG. 3M is an enlarged lateral end elevation of the soft ribs depicted in FIG. 3L.

FIG. 3N is the same lateral end elevation as FIG. 3M and depicts the soft ribs in a collapsed state.

FIGS. 7A and 7B are flow charts illustrating use of the patient transfer and transport device according to one embodiment of the present invention.

DETAILED DESCRIPTION

Figure 1:
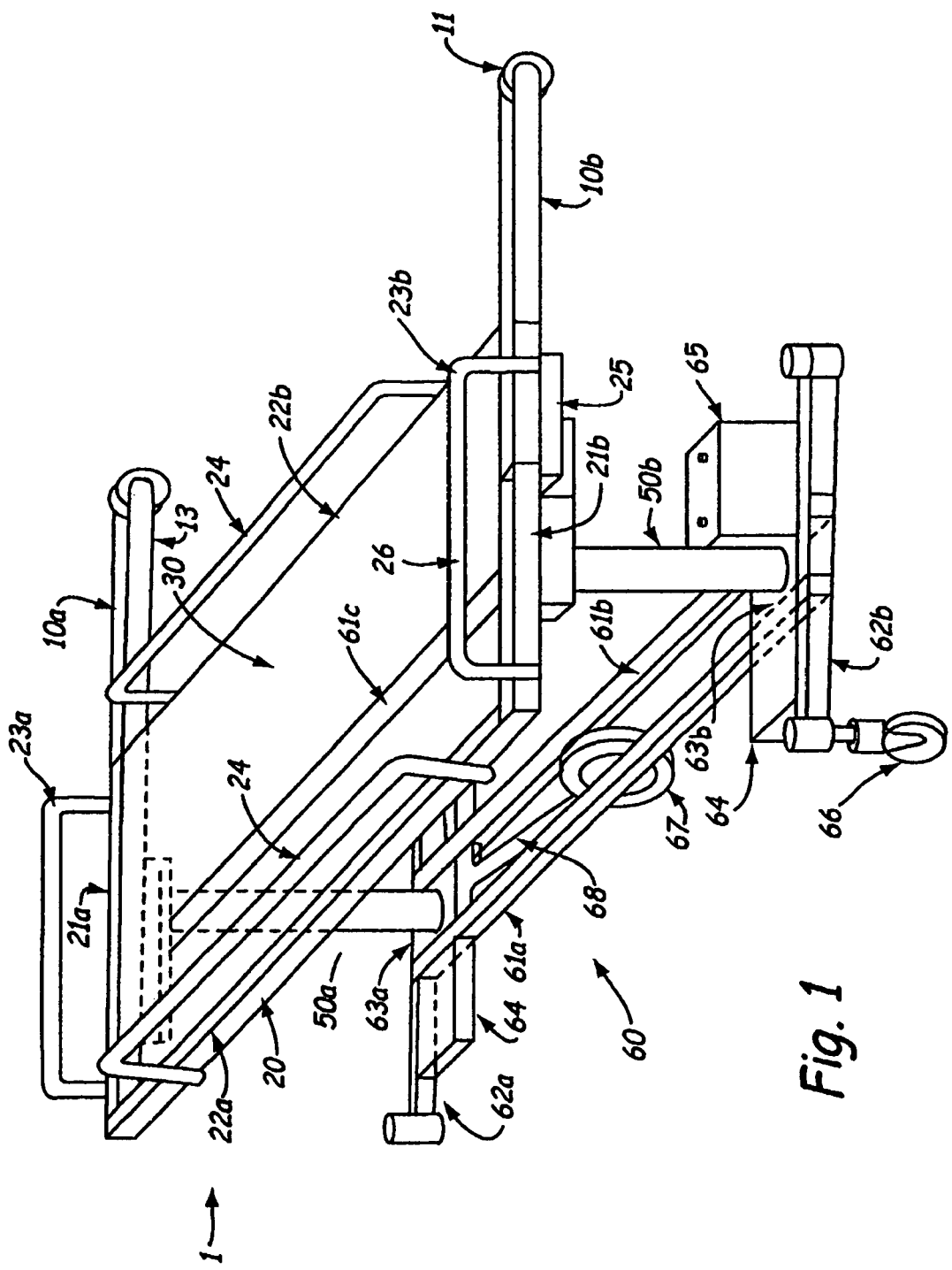
FIG. 1 is a perspective view illustrating the patient transfer and transport device according to one embodiment of the present invention.

FIG. 1 is a perspective view of a patient transfer and transport device 1, according to one embodiment of the present invention. As shown in FIG. 1, the patient transfer and transport device 1 has two transfer arms 10a, 10b, a platform receiving frame 20, a transfer platform 30, two support posts 50a, 50b, and a base 60. The base 60 and the support posts 50a, 50b support the frame 20 at a desirable height. The transfer arms 10a, 10b are attached to the frame 20 and support the transfer platform 30 during lateral motion away from the frame 20.

As further shown in FIG. 1, the platform receiving frame 20 has a first end 21a, a second end 21b, an enclosed side 22a, and an open side 22b. In one embodiment, the ends 21a, 21b are slotted-sleeve channels, as further explained below. A rail handle 23a is mounted on the first end 21a. A throttle rail handle 23b is mounted on the second end 21b. One of each of the transfer arms 10a, 10b is slidably mounted within each end 21a, 21b. Each transfer arm 10a, 10b is capable of being extended linearly, in a generally horizontal manner, out of its respective end 21a, 21b, away from the platform receiving frame 20, on the open side 22b of the frame 20.

The transfer platform 30 is located within the platform receiving frame 20 and is capable of being linearly translated, in a generally horizontal manner, through the open side 22b of the platform receiving frame 20, while being supported by the two transfer arms 10a, 10b. In the embodiment shown, the enclosed side 22a and the open side 22b will each have an integrated safety rail 24 to prevent the patient from rolling off of the transfer and transport device 1. In one embodiment, the transfer and transport device 1 further includes an actuator 25 for causing motion of the transfer arms 10a, 10b. In one embodiment, the actuator 25 is a linear actuator. In one embodiment, the transfer platform 30 includes a locking mechanism for preventing linear motion of the transfer platform 30 within the transfer arms 10a, 10b.

Figure 2:
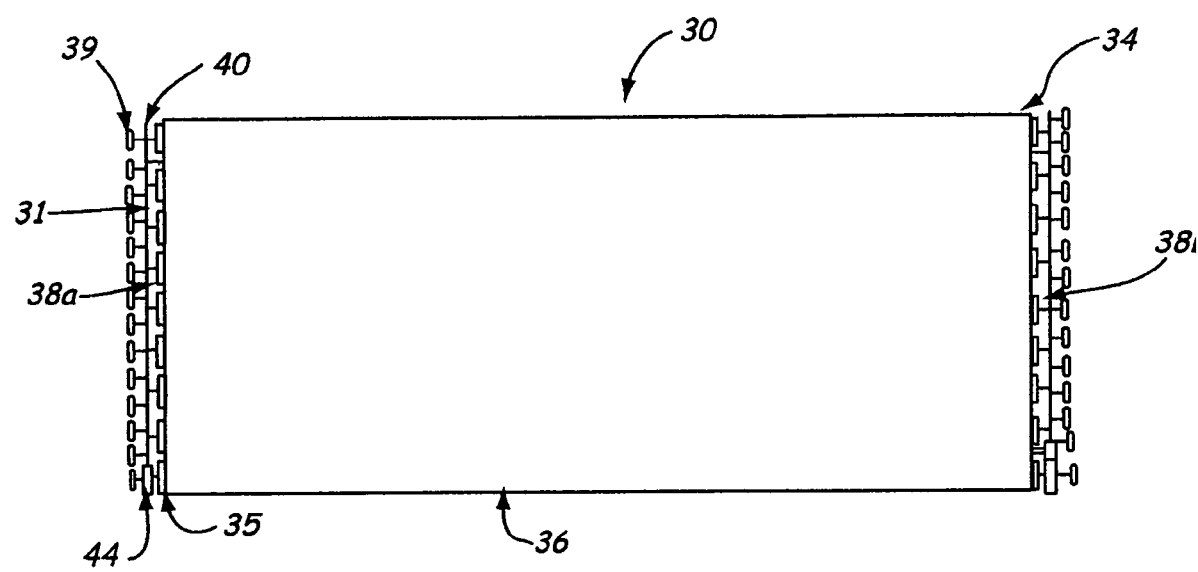
FIG. 2 is a top plan view of the transfer platform with its conveyor surface in place.
Figure 3A:
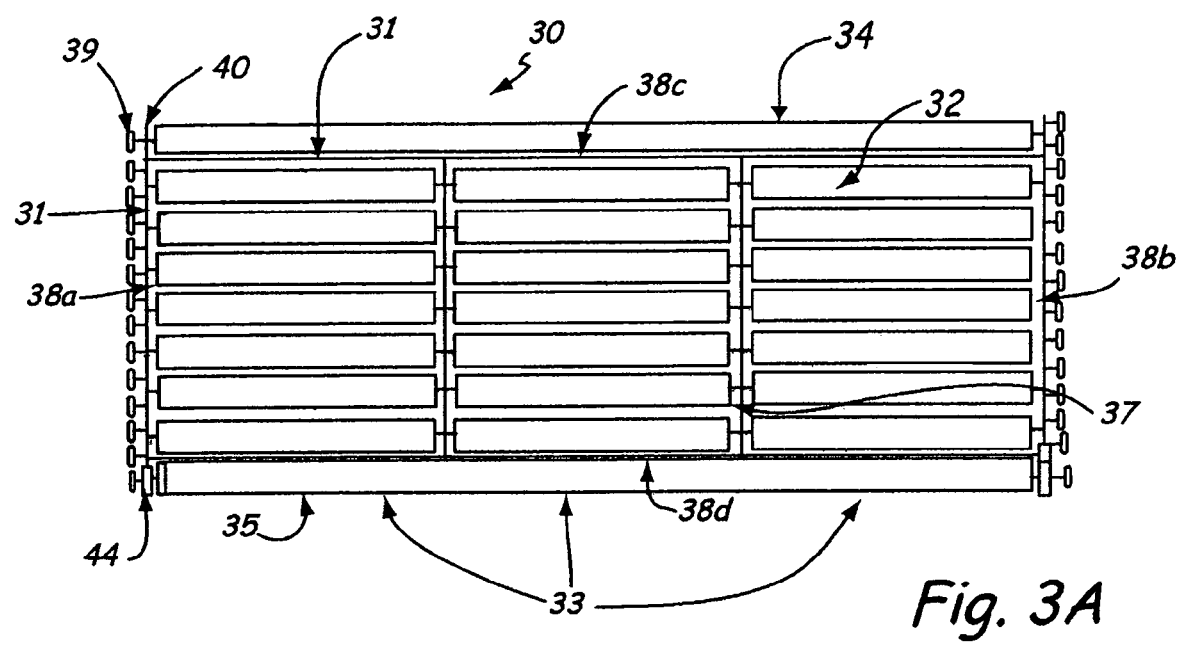
FIG. 3A is a top plan view of the transfer platform with its conveyor surface removed revealing rollers, roller banks, and a roller frame.

FIG. 2 shows a top plan view of the transfer platform 30, including a conveyor surface 36, and FIG. 3A shows a top plan view of the transfer platform 30, with the conveyor surface 36 removed. As shown in FIG. 3A, in one embodiment, the transfer platform 30 includes a roller frame 31 and a multitude of rollers 32. In one embodiment, as shown in FIG. 3A, the transfer platform includes three roller banks 33. In other embodiments more or fewer roller banks 33 are used. Depending on the strength of the rollers 32, multiple banks 33 may be required to provide a sufficiently strong bed to support the patient. As further shown in FIG. 3A, in one embodiment, the transfer platform 30 includes at least one drive roller 34. In another embodiment, no drive roller 34 is included. In the embodiment having no drive roller 34, the operator must manually rotate the transfer platform 30. In one embodiment, the transfer platform 30 also includes a tension roller 35 for maintaining tension on a conveyor surface 36. In another embodiment, two tension rollers are included. In one embodiment, the drive roller 34 is also equipped to serve as a tension roller. FIGS. 2 and 3A further show a multitude of carriage wheels 39, extending from each end of the transfer platform 30.

As best shown in FIG. 3A, the rollers 32 are generally parallel to each other and to the longitudinal dimension of the transfer platform 30. The rollers 32 are pivotably mounted within the roller frame 31 and are tightly spaced to support the patient. One embodiment of the invention would have a single roller bank 33 of rollers 32, each roller 32 running the full length of the patient transfer platform 30 uninterrupted. However, in the embodiment as illustrated in FIG. 3A, two or more roller banks 33 span the length of the patient transfer platform 30, to minimize the stresses on the connections between the rollers 32 and the roller frame 31. In this embodiment, the roller frame would have intermediate bracing members 37 that would separate each roller bank 33 from the other and would help support the ends of the rollers 32.

Figure 3J:
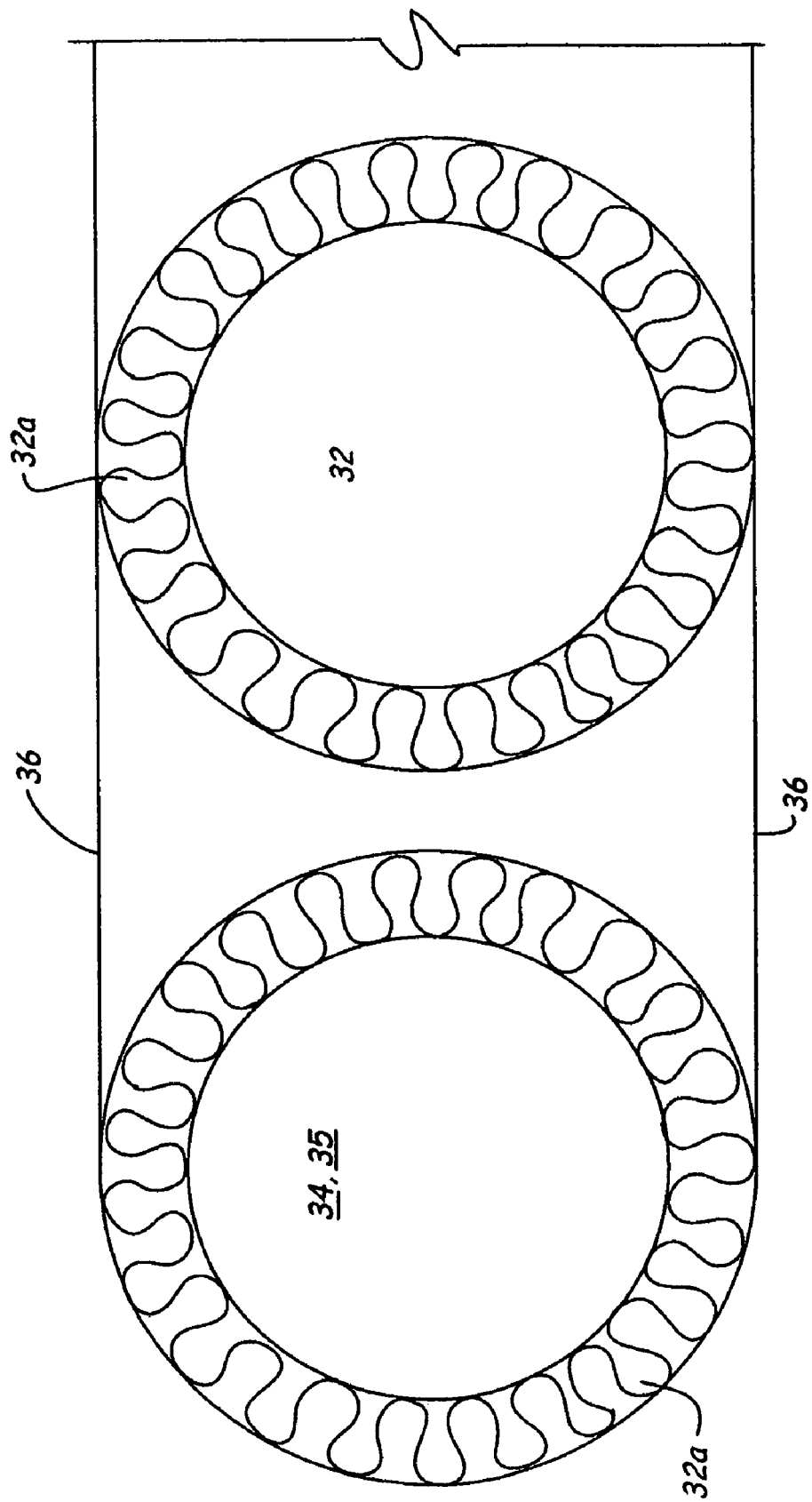
FIG. 3J is a lateral cross-sectional elevation of some of the rollers, according to one embodiment, where the conveyor surface travels on rollers that are surrounded by a soft resilient material for creating a soft, comfortable resting surface for the patient.

As shown in FIGS. 2 and 3A, the roller frame 31 has two ends 38a, 38b and two sides 38c, 38d. A conveyor surface 36 spans the roller frame 31 between the ends 38a, 38b and surrounds the entire roller frame 31 in one continuous belt enclosing the sides 38c, 38d and the roller banks 33. The conveyor surface 36 is washable for sanitizing purposes and is capable of being rotated around the roller frame 31. The conveyor surface 36 rides on the drive roller 34, the tension roller 35, and the rollers 32 of the roller banks 33 as the conveyor surface 36 rotates around the roller frame 31. In one embodiment, as illustrated in FIG. 3J, which is a lateral cross-sectional elevation of some of the rollers 32, 34, 35 in the roller frame 31, the conveyor surface 36 travels on rollers 32, 34, 35 that are surrounded by a soft resilient material 32a (such as one or more layers of foam or rubber) for creating a soft, comfortable resting surface. In one embodiment, the safety rail 24 is mounted to the roller frame 31, such that when the transfer platform 30 translates linearly, the safety rail 24 moves with it.

As shown in FIGS. 3B and 3C, in one embodiment, the transfer platform 30 includes a tapered leading edge 99 to assist in loading and unloading the patient. In one embodiment, the tapered leading edge 99 is created by using a set of rollers 100 having diameters that decrease toward the leading edge 99. In another embodiment, the tapered leading edge 99 is created by using a tapered low-friction material ending in a roller at the tapered leading edge 99. In one embodiment, the transfer platform 30 includes a shield 102 that extends along the bottom surface of the platform 30, below the conveyor surface 36 and acts to prevent any sheets or clothing on the patient's bed from being pulled off the bed by the conveyor surface 36.

In an alternative embodiment, as shown in FIGS. 3D and 3E, a low-friction platform 104 is substituted in place of the roller banks 33. In one embodiment, the drive roller 34 and the tension roller 35 are retained. In this embodiment, the conveyor surface 36 rides on the low-friction platform 104, the drive roller 34 and the tension roller 35. In one embodiment, the low-friction platform 104 has a soft resilient surface to provide the patient with a soft or cushioned surface on which to rest. For example, the low-friction platform 104 may have one or more layers of foam or rubber to provide a soft resilient surface. In another embodiment, the transfer platform 30 does not include the carriage wheels 39, but instead is coupled directly to the transfer arms 10a, 10b. In this embodiment, the transfer platform extends laterally from the frame 20 when the transfer arms 10a, 10b are extended.

In another embodiment, as shown in FIGS. 3F, 3G, 3H and 3I, the transfer platform 30 is adapted to incline for patient comfort. In this embodiment, the roller frame 31 has a stationary roller bank 105 and an inclinable roller bank 107, which includes a hinge 106 located at a desired pivot point. FIG. 3H shows the transfer platform 30 in a flat position with the inclinable roller bank 107 in the flat position. FIG. 3I shows the transfer platform 30 in the inclined position with the inclinable roller bank 107 in an inclined position. In this embodiment, the stationary roller bank 105 and the inclinable roller bank 107 each have their own separate independently driven drive rollers 34 and their own separate tension rollers 35. Also, the stationary roller bank 105 and the inclinable roller bank 107 each have their own separate conveyor surfaces 36. In another embodiment, a single conveyor surface 36 encompasses both roller banks 105, 107, and the conveyor surface 36 simply flexes at the hinge 106 as the hinge pivots 106 between the flat and inclined positions. In yet another embodiment, there are two inclinable roller banks 107, one for elevating the head and shoulders of the patient and the other for elevating the feet and legs of the patient.

In one embodiment, the transfer platform 30 further includes a replaceable cover adapted to mount to and cover the conveyor surface 36. The replaceable cover is adapted to absorb any of the patient's bodily fluids that may exit the patient during the transfer and transport process. The replaceable cover acts to protect the conveyor surface 36. In one embodiment, the replaceable cover is disposable such that a new replaceable cover is used with each patient transfer and transport process. In one embodiment, the replaceable cover is connected to the conveyor using an adhesive. In another embodiment the replaceable cover is connected to the conveyor using a hook-and-loop attachment mechanism. In one embodiment, hook-and-loop attachment strips extend around the entire periphery of the transfer platform, placed in at least two locations, such that the strips are oriented in-line with the shear force between the conveyor surface 36 and the replaceable cover.

In one embodiment, as illustrated in FIG. 3K, which is a lateral cross-sectional elevation of some of the rollers 32, 34, 35 in the roller frame 31, the conveyor surface 36 is padded to create a soft, comfortable resting surface for the patient. In one embodiment, the padding 36a is one or more layers of foam or rubber. In another embodiment, the padding 36a is a honeycomb structure, a system of chambers and pathways, or a series of tubes permanently filled with air, which results in an air mattress arrangement. In another embodiment, the padding 36a is a honeycomb structure, a system of chambers and pathways, or series of tubes wherein air is pumped into or vacuumed out of the honeycomb structure 36a by a compressor/vacuum pump located on the base 60 of the patient transfer and transport device 1. This allows the operator to adjust the level of firmness to meet the patient's desires.

In one embodiment, as illustrated in FIG. 3L, which is a lateral end elevation of some of the rollers 32, 34, 35 in the roller frame 31, at least a portion of the conveyor surface 36 is padded by a series of soft ribs 120, which each run longitudinally across the conveyor surface 36, generally parallel to the longitudinal axis of the rollers 32, 34, 35. In one embodiment, only part of the conveyor surface is covered with the ribs 120. In another embodiment, substantially all of conveyor surface 36 is covered with the ribs 120. These ribs 120 create a soft, comfortable resting surface for the patient. In one embodiment, the soft ribs 120 are one or more layers of foam or rubber. In another embodiment, each soft rib 120 is a tube permanently filled with air, which results in an air mattress arrangement. In another embodiment, each soft rib 120 is a tube wherein air is pumped into or vacuumed out of the soft ribs 120 by a compressor/vacuum pump located on the base 60 of the patient transfer and transport device 1. This allows the operator to adjust the level of firmness to meet the patient's desires.

In one embodiment, as shown in FIG. 3L, the end of each soft rib 120 is interconnected to the ends of its adjacent soft ribs 120 by an air canal 122. The air canals 122 provide a path between the compressor/vacuum pump and the soft ribs 120 by which air is pumped into or vacuumed out of all of the soft ribs 120 at the same time.

As shown in FIG. 3M, which is an enlarged lateral end elevation of the soft ribs depicted in FIG. 3L, each soft rib 120 has a top 121, a bottom 123, and a concave wall 124. The concave wall 124 forms the continuous vertical perimeter wall of each soft rib 120. A crease line 126 is located at the approximate top-to-bottom center of the concave wall 124.

As illustrated in FIG. 3N, which depicts the soft ribs 120 of FIG. 3M in a collapsed state, the crease line 126 facilitates the concave wall 124 collapsing in towards the interior of the soft rib 120 as air is vacuumed from the soft rib 120. Thus, the top 121 of each soft rib 120 displaces essentially vertically towards its respective bottom 123 when each soft rib 120 is collapsed into the collapsed position as shown in FIG. 3N. This allows each soft rib 120 to collapse into a repeatable compact collapsed position, which facilitates the free travel of the conveying surface 36 about the roller frame 31. While the soft ribs 120 are depicted as having concave walls 124 and flat tops 121, those skilled in the art will recognize that the soft ribs may have square, circular or other types of cross-sections. The configuration of soft ribs 120 illustrated is provided only for representative purposes and should not be interpreted as limiting the disclosed invention.

In one embodiment, the soft resilient rollers 32, 34, 35, illustrated in FIG. 3J, are combined with one of the padded conveyor surfaces 36 illustrated in FIGS. 3K and 3L. In another embodiment, the above-described soft resilient low-friction platform 104 is combined with one of the padded conveyor surfaces 36 illustrated in FIGS. 3K and 3L.

In one embodiment, the conveyor surface 36 may be rotated manually in either direction. In another embodiment, the conveyor surface 36 is rotated in either direction via an electric motor. In one embodiment, the conveyor surface 36 is rotated by one or more drive rollers 34 having integral electric motors within the drive rollers 34.

In one embodiment, the conveyor surface 36 may be locked by a locking mechanism to prevent the conveyor surface 36 from rotating. This locking mechanism may be manually or electrically operated.

As shown in FIG. 3A, all rollers 32, except the drive roller 34 and the tension roller 35, are located within the boundaries of the roller frame 31 formed by its ends 38a, 38b and sides 38c, 38d. The drive roller 34 and the tension roller 35 are located outside the boundaries formed by the sides 38c, 38d. The drive roller 34 and the tension roller 35 are mounted on extensions of the two ends 38a, 38b. The extensions that support the drive roller 34 are called drive extensions 40. The extensions that support the tension roller 35 are called tension extensions 41. The tension roller 35 is used to maintain the proper tension in the conveyor belt as will be explained below. In one embodiment, the drive roller 34 is connected to an electric motor and causes the conveyor surface 36 to rotate. In another embodiment, where the drive roller 34 is not powered by a motor, the conveyor surface is rotated manually.

Figure 4:
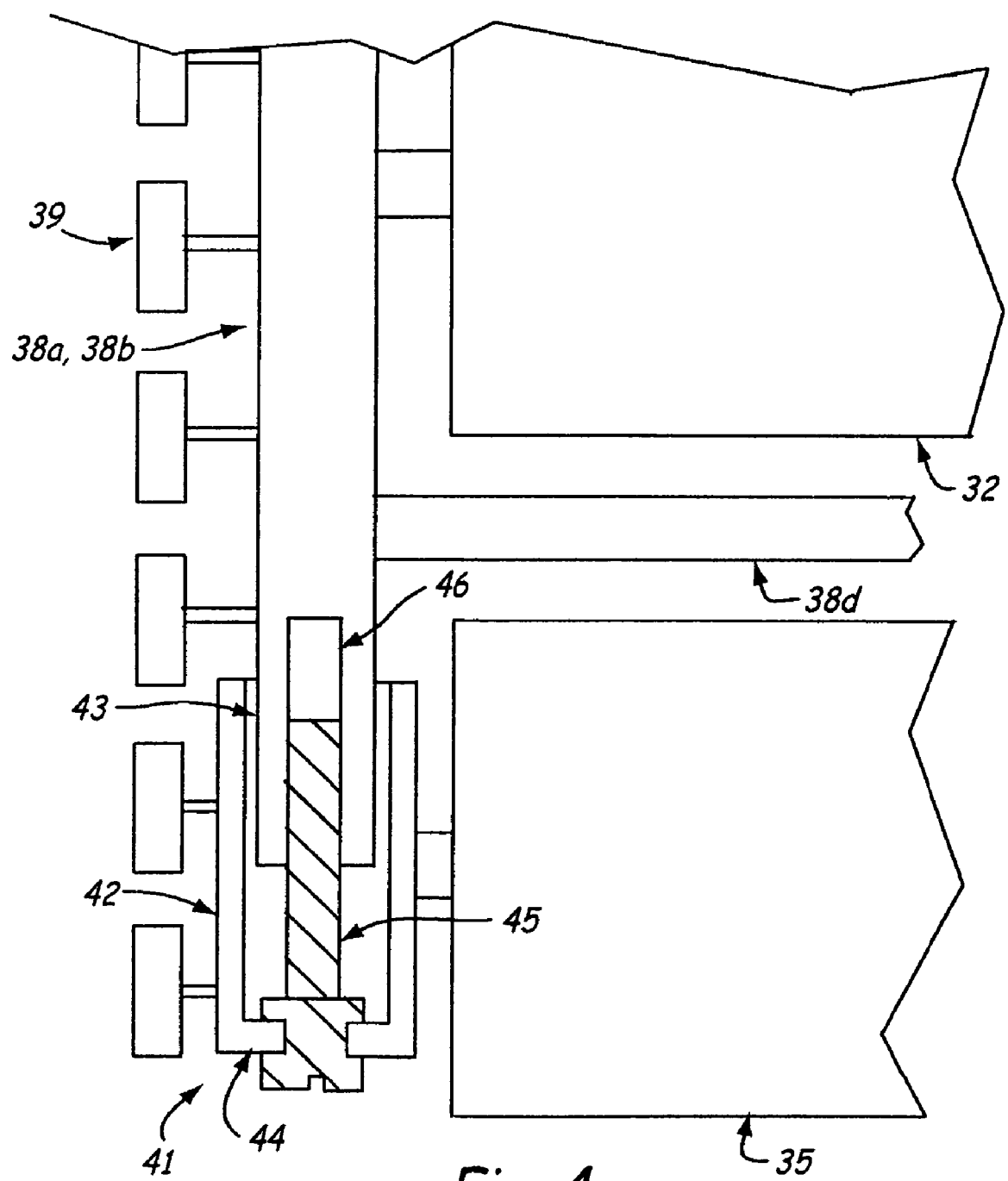
FIG. 4 is a cross-sectional plan view of a tension extension device.

FIG. 4 shows a cross-sectional plan view of the tension extensions 41 of the transfer platform 30, according to one embodiment of the present invention. As shown, the tension extensions 41 are comprised of a telescoping shell 42 that is capable of telescoping over or off of an inner member 43, which is the tip of the end 38a, 38b of the roller frame 31. The telescoping shell 42 has an enclosed end 44 through which a threaded rod 45 is pivotably secured. The threaded rod 45 runs down through the center of the telescoping shell 42 and is threadably engaged with the threaded hole 46 in the end of the inner member 43. The threaded rod 45 can then be rotated to extend or retract the telescoping shell 42 of the tension extension 41 in order to reduce or increase slack in the conveyor surface 36. Those skilled in the art will recognize that maintaining the proper tension in the conveyor surface 36 by extending the tension roller 35 via the tension extensions 41 will provide the necessary contact between the drive roller 34 and the conveyor surface 36 to allow the drive roller 34 to cause the conveyor surface 36 to rotate around the roller frame 31. Those skilled in the art will also recognize that proper adjustment of the tension in each tension extension 41 will prevent the conveyor surface 36 from skewing off of the surface of the rollers 32 as the conveyer surface 36 rotates. Finally, those skilled in the art will also recognize that the tension maintenance mechanism disclosed in this specification is just one of many similar configurations that are well known in the art. The tension maintenance mechanism illustrated here is only provided for representative purposes. In other embodiments, other known tension maintenance techniques are used.

Figure 5:
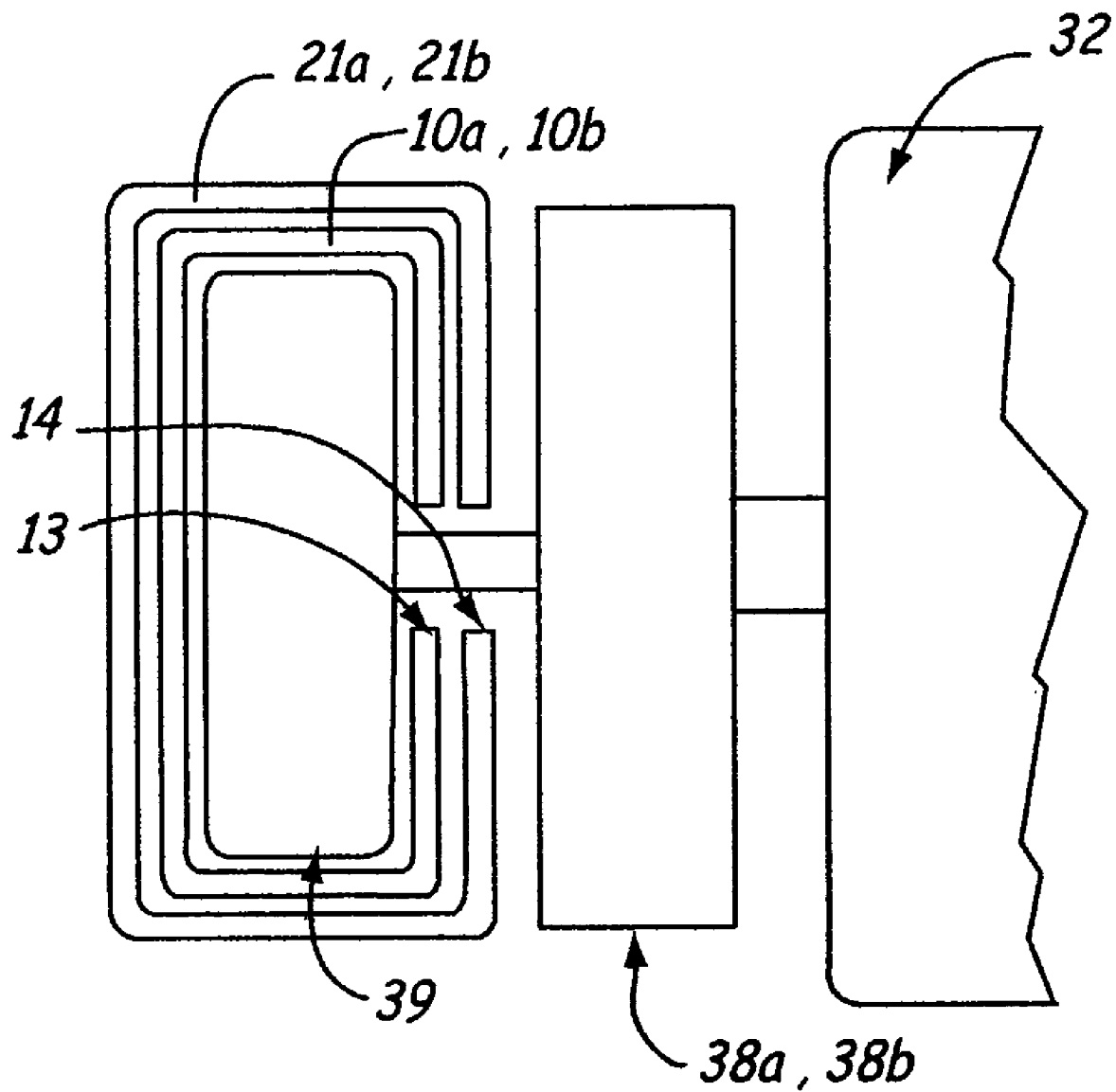
FIG. 5 is a latitudinal cross-sectional elevation view of a slotted sleeve channel end containing a transfer arm containing a carriage wheel.
Figure 6:
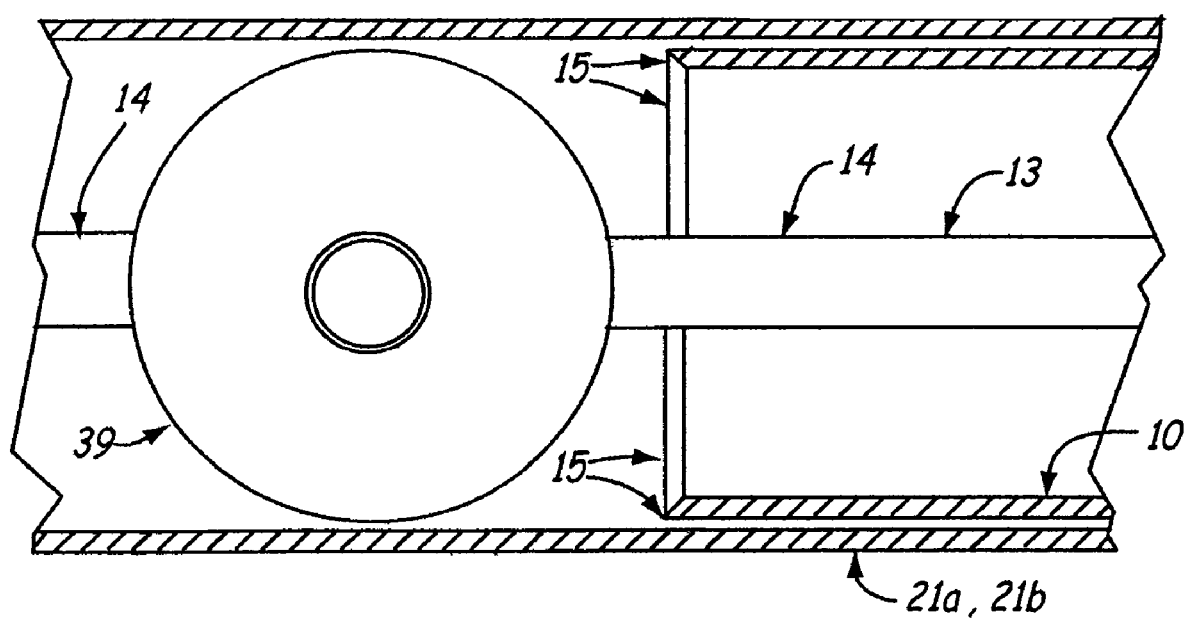
FIG. 6 is a longitudinal cross-sectional elevation view of the unexposed end of a transfer arm within a slotted sleeve channel end.

FIG. 5 and FIG. 6 show sectional views of the transfer arms 10a, 10b, according to one embodiment of the present invention. As shown, the transfer arms 10a, 10b are slidably mounted within each slotted sleeve channel end 21a, 21b. Each transfer arm 10a, 10b is capable of being horizontally extended out of its respective slotted sleeve channel end 21a, 21b, away from the frame 20, on the open side 22b of the frame 20. In one embodiment of the invention, the transfer arms 10a, 10b may be extended and retracted manually. In another embodiment, the transfer arms 10a, 10b are automatically extended and retracted. In one embodiment, the transfer arms 10a, 10b are extended or retracted by the linear actuator 25 located adjacent to each slotted sleeve channel end 21a, 21b. In various embodiments, the linear actuators 25 act on the transfer arms 10a, 10b via hydraulic or pneumatic rams, levers, gears or screws, or other mechanical means of transferring force. In one embodiment, each linear actuator 25 has an integral electric motor for operating a system of gears and gear racks, screws, and/or levers to cause the transfer arms 10a, 10b to extend or retract. In another embodiment, an electric hydraulic or pneumatic pump provides pressure to the rams of the actuators 25 to cause the transfer arms 10a, 10b to extend or retract. In one embodiment, a locking mechanism is provided for locking each transfer arm 10a, 10b in place to prevent its horizontal translation. The locking mechanism may be either manually or electrically operated.

In one embodiment, as shown in FIG. 1, a low profile roller 11 is mounted on the exposed end of each transfer arm 10a, 10b. In one embodiment, each low profile roller 11 is fitted with a contact sensor that indicates when the low profile roller 11 has made sufficiently solid contact with the top surface of the hospital bed to facilitate the patient transfer. In this embodiment, the sensor provides an input to the transfer arm control system.

As shown in FIG. 6, in one embodiment, each unexposed end (i.e., the end that always remains within the slotted sleeve channel end 21a, 21b) of the transfer arm 10a, 10b has tapered edges 15 to allow the carriage wheels 39 to easily roll into or out of the transfer arms 10a, 10b when the transfer arms 10a, 10b are in their extended position. Each transfer arm 10a, 10b has one carriage wheel slot 13 that runs nearly the full length of the transfer arm 10a, 10b. Each carriage wheel slot 13 opens horizontally towards the center of the transfer platform 30. Similarly, each slotted sleeve channel end 21a, 21b has one carriage wheel slot 14 that runs nearly the full length of the slotted sleeve channel end 21a, 21b. Each carriage wheel slot 14 of the slotted sleeve channel end 21a, 21b also opens horizontally towards the center of the transfer platform 30 and aligns with and matches dimensionally the carriage wheel slot 13 of its respective transfer arm 10a, 10b, as can be seen in FIG. 5 and FIG. 6.

As shown in FIG. 2 and FIG. 3A, multiple carriage wheels 39 are rollably mounted on each roller frame end 38a, 38b, the axis of each carriage wheel 39 being generally parallel to the long dimension of the transfer platform 30. As shown in FIG. 5 and FIG. 6, when the transfer and transport device 1 is assembled, the carriage wheels 39 are located within the carriage wheel slots 13 of the transfer arms 10a, 10b and the carriage wheel slots 14 of the slotted sleeve channel ends 21a, 21b. The carriage wheels 39 roll in the carriage wheel slots 13, 14, thus allowing the transfer platform 30 to translate linearly, in a generally horizontal manner, out through the open side 22b of the frame 20 when the transfer arms 10a, 10b are in the extended position as shown in FIG. 1. In one embodiment, the operator manually translates the transfer platform 30 horizontally. In another embodiment, the transfer platform 30 is powered by an electric motor. In one embodiment, a cam lock system is provided on each transfer arm 10a, 10b to lock the carriage wheels 39 to prevent the transfer platform 30 from translating horizontally.

As shown in FIG. 1, the frame 20 is supported by two support posts 50a, 50b. The bottom of each support post 50a, 50b rests on and connects to the base 60. In one embodiment, each support post 50a, 50b is a hydraulic or pneumatic ram, which is pumped manually or by an electric pump in order to raise or lower the frame 20. Those skilled in the art will readily recognize other means of extending or shortening the support posts 50a, 50b in order to raise or lower the frame 20. These means include mechanical force transferring devices like a spur-gear and gear rack combination, a worm-gear screw jack, or other similar means for transferring force mechanically. All of these devices may be powered by one or more electric motors. In an alternative embodiment of the present invention, the support posts 50a, 50b, with their accompanying lifting devices, are replaced with a scissor lift as is well known in the art.

As illustrated in FIG. 1, the base 60 is comprised of two long braces 61a, 61b, two short braces 62a, 62b, and two post platforms 63a, 63b. Each support post 50a, 50b is supported by and centered on one post platform 63a, 63b. The two long braces 61a, 61b run parallel to each other and horizontally between their perpendicular connections to the two short braces 62a, 62b. Each post platform 63a, 63b rests horizontally on and is connected to the top horizontal surfaces of the long braces 61a, 61b and the short braces 62a, 62b, near the intersections of the braces 61a, 61b, 62a, 62b. In other embodiments, other structural configurations are employed.

As further shown in FIG. 1, in one embodiment, the transfer and transport device 1 includes one or more batteries 65 coupled to the base 60. The batteries 65 are secured in battery trays 64 and provide power for the various electric motors on the transfer and transport device 1. The batteries 65 also provide ballast to prevent the transfer and transport device 1 from tipping. In one embodiment, four 12-volt gel batteries are included. In one embodiment, the base 60 includes castors 66, which are lockable and capable of pivoting 360 degrees. In one embodiment, the transfer and transport device 1 includes a drive wheel 67 mounted to the base 60. The drive wheel 67 has an electric motor and gearbox in its hub. In one embodiment, the drive wheel 67 is mounted on a trailing arm suspension 68. The trailing arm suspension 68 is spring loaded and attached to the base 60. The drive wheel 67 may be raised or lowered by manual or motorized means. Raising the drive wheel 67 completely will allow for increased ease of maneuverability.

In one embodiment, the electrical system will have the following features: a programmable motor controller; a built-in battery charger; a control panel with status indicators; a touch sensitive throttle 26 to control the drive wheel 67; a handheld remote control to control all transfer functions; an emergency shutoff; and multiple safety interlocks. The touch sensitive throttle 26 is ergonomically contoured and located on the throttle rail handle 23b. The touch sensitive throttle 26 is used by the operator to cause the drive wheel 67 to go forward or backward. Speed and direction is proportional to the magnitude and direction of the force applied to the touch sensitive throttle 26 by the operator. For example, if the operator pushes forward on the throttle 26, the patient transfer and transport device 1 will go forward. Likewise, if the operator pulls backwards on the throttle 26, the device 1 will go backwards. If the operator pulls or pushes hard on the throttle 26, the device 1 will move more quickly than it will if the operator pushes or pulls lightly on the throttle 26. In one embodiment, the device 1 includes a microprocessor for executing code to control one or more aspects of the operation of the device 1.

By using the hand held remote control, the operator will be able to perform one or more of the following maneuvers: extend and retract the transfer arms 10a, 10b linearly and in a generally horizontal manner, raise or lower the transfer platform 30 by actuating the hydraulic or pneumatic rams in the support posts 50a, 50b, translate generally horizontally and linearly the transfer platform 30, and rotate the conveyor surface 36. In one embodiment, the remote control communicates with the microprocessor on the device 1 via wireless communication, such as radio frequency or infrared communication. In another embodiment, the remote control communicates with the microprocessor on the device 1 via hardwired connection.

In one embodiment, electronic safety interlocks are provided for the integrated safety rails 24, the drive wheel 67 motor, the hydraulic/pneumatic rams in the support posts 50a, 50b, the motor for the conveyor surface 36, the linear actuator 25 for the transfer arms 10a, 10b, and the motor that moves the transfer platform 30 generally horizontally. Status indicators on the control panel, in addition to indicating the battery charge and other useful information, will indicate the status of these safety interlocks.

Figure 7B:
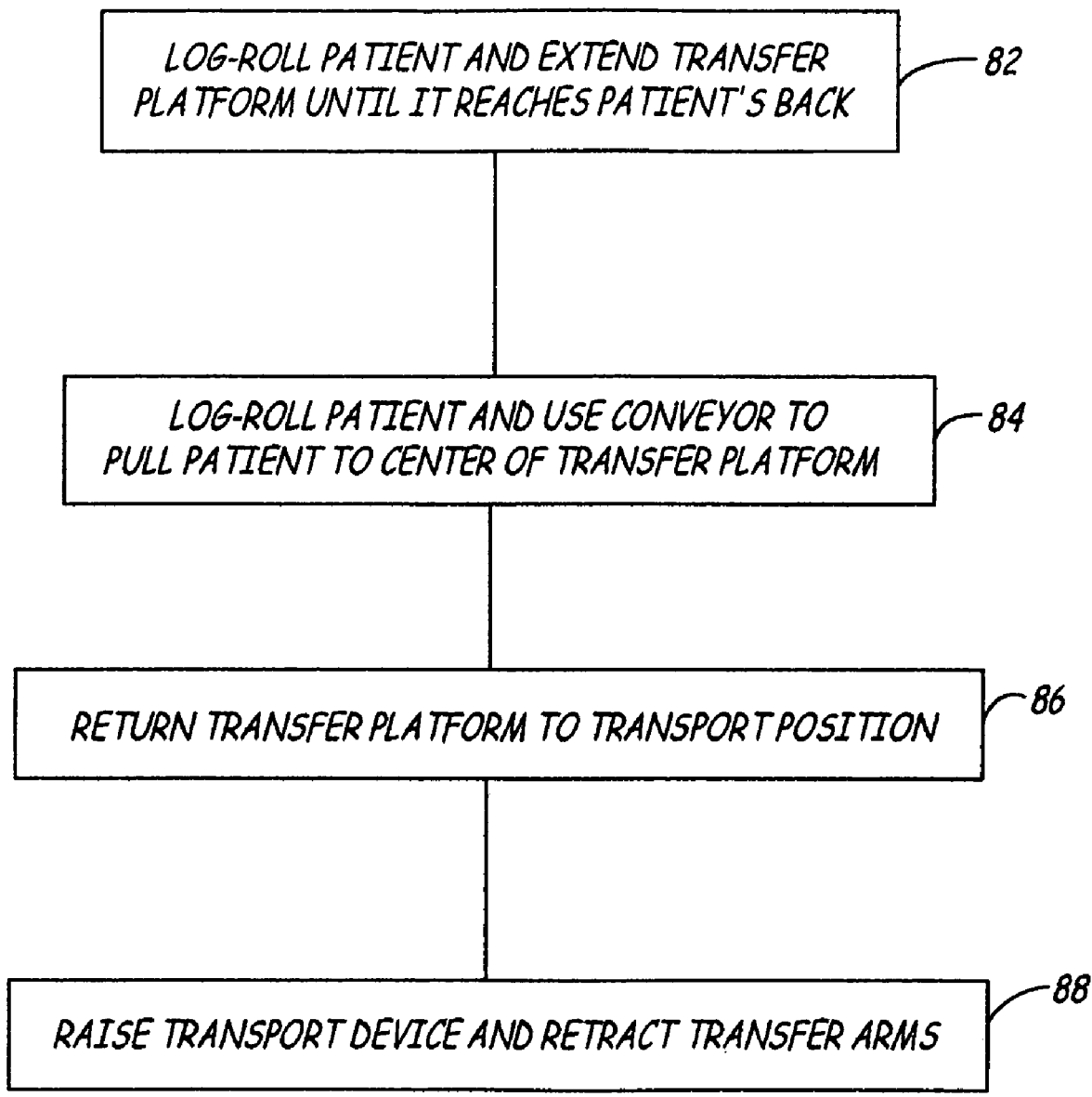
Figure 8:
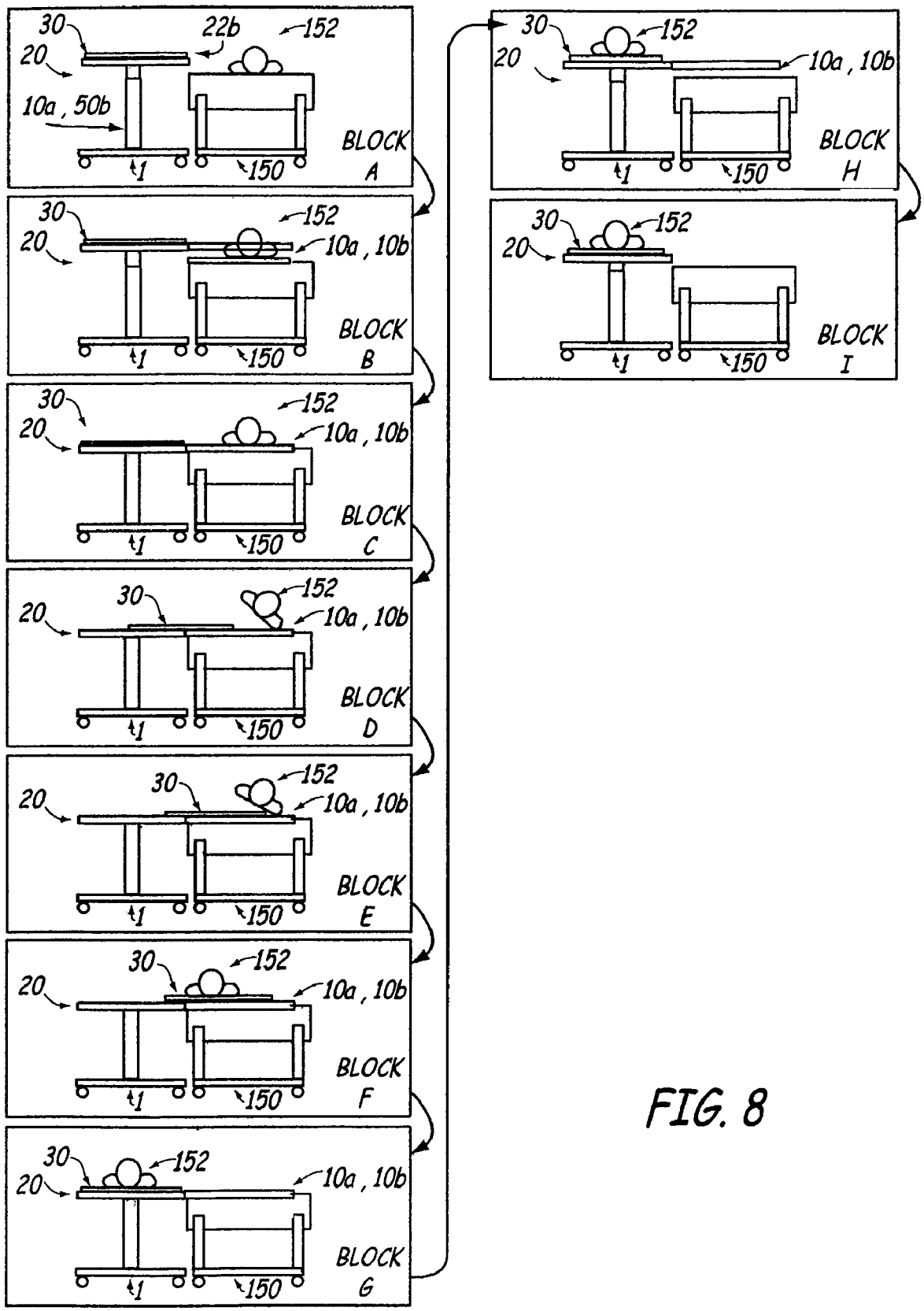
FIG. 8 schematically depicts the series of steps taken to transfer a patient from a hospital bed onto the patient transfer and transport device.
Figure 9:
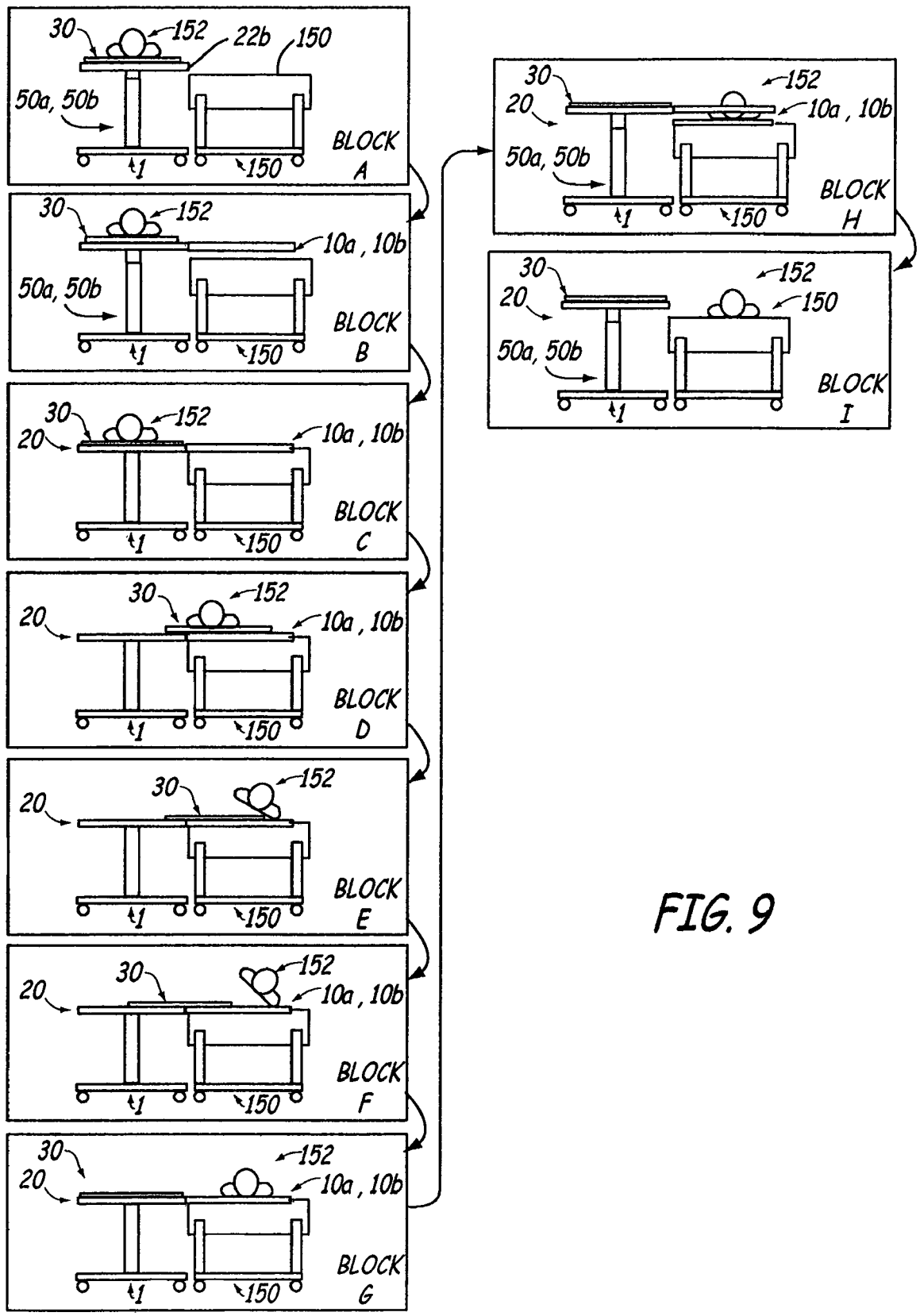
FIG. 9 schematically depicts the series of steps taken to transfer a patient from the patient transfer and transport device to a hospital bed.

FIGS. 7A and 7B are flow charts showing a method 70 of using the patient transfer and transport device 1, according to one embodiment of the present invention, to transfer a patient from a hospital bed onto the patient transfer and transport device 1. FIG. 8 schematically depicts the series of steps taken in the method 70 to transfer a patient from a hospital bed onto the patient transfer and transport device 1. FIG. 9 schematically depicts the series of steps taken to transfer a patient from the patient transfer and transport device 1 to a hospital bed (i.e., FIG. 9 depicts the method 70 in reverse).

While reference is made to transferring to and from a hospital bed, the same procedure is used for transferring the patient to and from other medical patient support surfaces found in a medical environment, including procedural surfaces (e.g., an x-ray table and an operating table). Any reference to bed or hospital bed, therefore, also includes other medical patient support surfaces including procedural surfaces. As shown in FIGS. 7A, 7B and 8, the operator of the transfer and transport device 1 maneuvers the empty transfer and transport device 1 into position along side the patient's bed 150, until the open side 22b is adjacent to the side of the bed 150 and the longitudinal centers of the patient 152 and the device 1 coincide (block 72; block A). Next, the operator adjusts the support posts 50a, 50b to adjust the height of the transfer and transport device 1 so that the transfer arms 10a, 10b will clear the top of the bed 150 when extended (block 74; block A). The operator lowers the integrated safety rail 24 of the device 1 on the open side 22b and locks the castors 66 to prevent movement of the transfer and transport device 1 during patient transfer (block 76; block A).

The operator utilizes the remote control to extend the transfer arms 10a, 10b generally horizontally until the low profile roller 11 on the end of each transfer arm 10a, 10b is located near the centerline of the patient's hospital bed 150 (block 78; block B). At this point, the transfer arms 10a, 10b will straddle the patient 152 end to end. The operator uses the remote control to lower the transfer platform 30 until the contact sensors located on the low profile rollers 11 indicate solid contact between the patient's bed top and the transfer arms 10a, 10b (block 80; block C). Extending the transfer arms 10a, 10b so that the low profile rollers 11 are at least as far as the center of the bed 150 and lowering the transfer arms 10a, 10b solidly onto the bed top will allow the patient's bed 150 to help support the transfer arms 10a, 10b, thus preventing the transfer and transport device 1 from tipping over during the loading of the patient 152 onto the transfer platform 30.

At this point, in one embodiment, the operator may use the remote control to cause the compressor or compressed air storage tank to inflate the padded conveyor surface 36 prior to loading the patient onto the transfer platform. Alternatively, the operator may wait to inflate the padded conveyor surface 36 until after the patient is resting on the conveyor surface 36.

The operator (or another member of the hospital staff) then log-rolls the patient 152 to expose the patient's back to the transfer and transport device 1 and extends the transfer platform 30 linearly, in a generally horizontal manner, out of its transport position within the frame 20 until the edge of the transfer platform 30 reaches the patient's back (block 82; block D). The operator then locks the transfer platform 30 to prevent its horizontal linear motion, lowers the patient 152 onto the edge of the transfer platform 30, and causes the conveyor surface 36 to rotate in a direction that will pull the patient 152 up onto the transfer platform 30, until the patient 152 is centered on the transfer platform 30 (block 84; blocks E and F). The operator then uses the remote control to unlock and move the transfer platform 30 linearly, in a generally horizontal manner, back to its transport position within the frame 20, where it is locked both linearly and rotationally (block 86; block G). In one embodiment, once the patient transport platform 30 is back in transport position within the frame 20, a sensor is contacted, automatically stopping the movement of the transfer platform 30.

The operator then uses the remote control to raise the device 1 to reduce the pressure on the transfer arms 10a, 10b and to retract the transfer arms 10a, 10b (block 88; blocks H and I). The castors 66 are unlocked and the transfer and transport device 1 is maneuvered away from the patient's bed. The remote control is then used to lower the transfer platform 30 to transport height and to lower the drive wheel 67. The operator then activates the drive wheel 67 to propel the device 1 forward by pushing on the touch sensitive throttle 26 located on the throttle rail handle 23b. Likewise, the drive wheel 67 will propel the device 1 backwards when the operator pulls on the touch sensitive throttle 26. The touch sensitive throttle 26 has proportional control. Thus, the rotational speed of the drive wheel 67 will be relative to the magnitude of the force applied to the throttle 26 by the operator. For example, increasing the force applied to the throttle 26 results in increased speed while decreasing the force results in decreased speed. Using the transfer and transport device 1, the patient can then be transported to another location and transferred to another bed by reversing the above-recited steps (see FIG. 9, blocks A–I).

In one embodiment, the microprocessor is programmed to automatically cause many of the above steps to be performed to assist a single operator in performing the transfer process. For example, in one embodiment, the remote control includes an "extend arms" button, which triggers the microprocessor to cause extension of the arms and lowering of the platform until a signal is received from the sensor indicating contact with the bed. In one embodiment, the remote control includes an "extend platform" button, which triggers the microprocessor to unlock the transfer platform, linearly translate the platform out, in a generally horizontal manner, onto the transfer arms, lock the platform linearly, and initiate rotation of the conveying surface. In one embodiment, the remote control includes a "retract platform" button, which triggers the microprocessor to stop rotation of the conveying surface, unlock the platform linearly, retract the platform linearly, in a generally horizontal manner, to its home position, and relock the platform both linearly and rotationally. In another embodiment, the remote control includes a separate button to start and stop rotation of the conveying surface. In another embodiment, the remote control includes a separate button to actuate the compressor and/or compressed air storage tank to cause the padded conveyor surface to inflate. In another embodiment, the remote control includes a separate button to actuate the vacuum pump to deflate the padded conveyor surface 36. In other embodiments, the remote control includes other configurations of buttons, as would be apparent to one skilled in the art.

Although the present invention has been described with reference to preferred embodiments, persons skilled in the art will recognize that changes may be made in form and detail without departing from the spirit and scope of the invention.

I claim:

1. An apparatus for moving a patient between a patient support surface and the apparatus, the apparatus comprising:
 a frame supported by a wheeled base and comprising first and second transfer arms adapted to extend away from the frame, wherein the wheeled base comprises a powered drive wheel; and
 a patient support platform supported by the frame and adapted to extend away from the frame along the transfer arms,
 wherein the transfer arms, platform and frame are configured such that the transfer arms are capable of extending away from the frame before the platform is allowed to extend.

2. The apparatus of claim 1, wherein when the transfer arms are extended and in contact with the patient support surface, the transfer arms serve to stabilize the apparatus as the patient support platform displaces along transfer arms.

3. The apparatus of claim 1, wherein the distance between the wheeled base and frame is adjustable.

4. The apparatus of claim 1, wherein the frame further comprises first and second latitudinal ends and first and second longitudinal sides that are located between the first and second ends.

5. The apparatus of claim 4, wherein the ends and sides of the frame define an area in which the platform is received when the platform has not been extended away from the frame.

6. The apparatus of claim 5, wherein the first side has an open configuration that allows the platform to exit through the first side of the frame when extending away from the frame.

7. The apparatus of claim 6, wherein the first side comprises a side safety rail that may be lowered to allow the platform to exit the frame when extending away from the frame.

8. The apparatus of claim 4, wherein the first end comprises a throttle handle for controlling the speed and direction of the drive wheel.

9. An apparatus for moving a patient between a patient support surface and the apparatus, the apparatus comprising:
a frame supported by a wheeled base and comprising first and second transfer arms adapted to extend away from the frame; and
a patient support platform supported by the frame, adapted to extend away from the frame along the transfer arms, and comprising a conveyor surface, a drive roller and a low-friction surface,
wherein the conveyor surface is disposed around the platform, the drive roller is adapted to displace the conveyor surface and the low-friction surface is adapted to support the conveyor surface as said surface is displaced,
wherein the transfer arms, platform and frame are configured such that the transfer arms are capable of extending away from the frame before the platform is allowed to extend.

10. The apparatus of claim 9, wherein the low-friction surface comprises a soft resilient surface.

11. An apparatus for moving a patient between a patient support surface and the apparatus, the apparatus comprising:
a frame supported by a wheeled base and comprising first and second transfer arms adapted to extend away from the frame; and
a patient support platform supported by the frame, adapted to extend away from the frame along the transfer arms, and comprising a conveyor surface, a drive roller and a roller bank,
wherein the conveyor surface is disposed around the platform, the drive roller is adapted to displace the conveyor surface and the roller bank is adapted to support the conveyor surface as said surface is displaced,
wherein the transfer arms, platform and frame are configured such that the transfer arms are capable of extending away from the frame before the platform is allowed to extend.

12. The apparatus of claim 11, wherein the roller bank comprises a roller circumferentially enclosed by a soft resilient surface.

13. The apparatus of claim 11, wherein the platform has a tapered leading side edge.

14. The apparatus of claim 11, wherein at least a portion of the conveyor surface comprises a padded area.

15. The apparatus of claim 14, wherein the padded area is removable from the conveyor surface.

16. The apparatus of claim 14, wherein an operator can cause the padded area to inflate or deflate to adjust the degree of padding.

17. The apparatus of claim 11, wherein the platform further comprises a shield extending along a bottom surface of the platform such that the conveyor surface passes between the shield and the bottom surface of the platform.

18. An apparatus for moving a patient between a patient support surface and the apparatus, the apparatus comprising:
a frame supported by a wheeled base and comprising first and second transfer arms adapted to extend away from the frame; and
a patient support platform supported by the frame, adapted to extend away from the frame along the transfer arms, comprising a conveyor surface disposed around the platform, and wherein the platform is inclinable,
wherein the transfer arms, platform and frame are configured such that the transfer arms are capable of extending away from the frame before the platform is allowed to extend.

19. An apparatus for moving a patient between a patient support surface and the apparatus, the apparatus comprising:
a frame supported by a wheeled base and comprising first and second transfer arms adapted to extend away from the frame; and
a patient support platform supported by the frame and adapted to extend away from the frame along the transfer arms,
wherein the transfer arms, platform and frame are configured such that the transfer arms are capable of extending away from the frame before the platform is allowed to extend,
wherein at least one of the transfer arms comprises a contact sensor for indicating when said transfer arm, when in an extended state, has adequately contacted the patient support surface.

20. An apparatus for moving a patient between a patient support surface and the apparatus, the apparatus comprising:
a frame supported by a wheeled base and comprising first and second transfer arms adapted to extend away from the frame; and
a patient support platform supported by the frame and adapted to extend away from the frame along the transfer arms,
wherein the transfer arms, platform and frame are configured such that the transfer arms are capable of extending away from the frame before the platform is allowed to extend,
wherein each of the transfer arms comprise an electrically powered linear actuator adapted to extend said arms away from the frame.

21. An apparatus for moving a patient between a patient support surface and the apparatus, the apparatus comprising:
a frame supported by a wheeled base and comprising first and second transfer arms adapted to extend away from the frame; and
a patient support platform supported by the frame and adapted to extend away from the frame along the transfer arms,
wherein the transfer arms, platform and frame are configured such that the transfer arms are capable of extending away from the frame before the platform is allowed to extend,
wherein each of the transfer arms are telescopically extendable from the frame.

22. The apparatus of claim 1, further comprising a remote control for controlling at least some of the functions of the apparatus.

* * * * *